United States Patent
Byun et al.

(10) Patent No.: US 8,323,813 B2
(45) Date of Patent: Dec. 4, 2012

(54) RECHARGEABLE BATTERY INCLUDING AN EXTENSIBLE MEMBER

(75) Inventors: Sang-Won Byun, Suwon-si (KR); Tatsuya Hashimoto, Suwon-si (KR); Sang-Eun Cheon, Suwon-si (KR); Yong-Sam Kim, Suwon-si (KR); Hyo-Seob Kim, Suwon-si (KR); Sung-Bae Kim, Suwon-si (KR); Soo-Seok Choi, Suwon-si (KR)

(73) Assignee: SB LiMotive Co., Ltd., Yongin-si (KR)

( * ) Notice: Subject to any disclaimer, the term of this patent is extended or adjusted under 35 U.S.C. 154(b) by 333 days.

(21) Appl. No.: 12/701,401

(22) Filed: Feb. 5, 2010

(65) Prior Publication Data

US 2010/0291421 A1    Nov. 18, 2010

Related U.S. Application Data

(60) Provisional application No. 61/178,357, filed on May 14, 2009.

(51) Int. Cl.
*H01M 2/00* (2006.01)

(52) U.S. Cl. ......... 429/61; 429/161; 429/178; 429/211; 429/7

(58) Field of Classification Search .................. 429/61, 429/62, 65, 53, 56, 57, 58, 59, 93, 92, 90, 429/7, 178, 211, 161; 320/162
See application file for complete search history.

(56) References Cited

U.S. PATENT DOCUMENTS

| | | | |
|---|---|---|---|
| 4,096,866 A | 6/1978 | Fischell | |
| 6,143,440 A * | 11/2000 | Volz et al. | 429/92 |

FOREIGN PATENT DOCUMENTS

| | | |
|---|---|---|
| DE | 27 19 301 | 11/1977 |
| EP | 1 076 350 A2 | 2/2001 |
| EP | 2 284 929 A1 | 2/2011 |
| JP | 05-062664 | 3/1993 |
| JP | 08-124554 | 5/1996 |
| JP | 09-223491 | 8/1997 |
| JP | 2000-182598 | 6/2000 |
| JP | 2001-052425 | 2/2001 |
| JP | 2004-319463 | 11/2004 |
| JP | 2005-044626 | 2/2005 |

(Continued)

OTHER PUBLICATIONS

KIPO Letters Patent dated Jan. 11, 2012, for corresponding Korean Patent application 10-2010-0031546, 14 pages.

(Continued)

*Primary Examiner* — Raymond Alejandro
(74) *Attorney, Agent, or Firm* — Christie, Parker & Hale, LLP

(57) ABSTRACT

According to an embodiment of the present invention, a rechargeable battery includes a case, a first electrode coupled to the case, a second electrode coupled to the case and the second electrode having a portion extending outside of the case, a short bar electrically coupled to the portion of the second electrode, and an extensible member extending from the case and at least a portion of the short bar being on the extensible member with a gap therebetween. The extensible member is configured to couple the short bar electrically to the first electrode in response to an overcharging condition of the rechargeable battery, thereby short-circuiting the first and second electrodes via the short bar.

18 Claims, 7 Drawing Sheets

FOREIGN PATENT DOCUMENTS

JP 2006-228520 8/2006
WO WO 2007/093626 A1 8/2007

OTHER PUBLICATIONS

Patent Abstracts of Japan and English machine translation of Japanese Publication 05-062664, 9 pages.
Patent Abstracts of Japan and English machine translation of Japanese Publication 2000-182598, 21 pages.
EPO Office Action dated Jun. 17, 2011 for Application No. 10 162 693.5-1227 corresponding to the above referenced European Patent Application, 4 pages.
European Search Report dated Aug. 18, 2010, for corresponding European Patent application 10162693.5.
SIPO Office action dated May 29, 2012, for corresponding Chinese Patent application 201010171095.5, (10 pages).
Patent Abstracts of Japan, and English machine translation of Japanese Publication 2005-044626 (11 pages).

\* cited by examiner

RECHARGEABLE BATTERY INCLUDING AN EXTENSIBLE MEMBER

CROSS-REFERENCE TO RELATED APPLICATION

This application claims priority to and the benefit of U.S. Provisional Patent Application No. 61/178,357, filed on May 14, 2009, the entire content of which is incorporated herein by reference.

BACKGROUND OF THE INVENTION

1. Field of the Invention

An embodiment of the present invention relates to a rechargeable battery, more particularly.

2. Description of the Related Art

Prismatic rechargeable batteries for hybrid electric vehicle (HEV) have a heat dissipation efficiency superior to cylindrical rechargeable batteries, and have improved safety over the cylindrical rechargeable batteries when overcharged.

Therefore, current interrupt devices (CIDs), which interrupt currents when the batteries are overcharged, are not applied to the prismatic rechargeable batteries for HEV.

However, plug in hybrid electric vehicles (PHEVs) and electric vehicles as well as HEV demand high-capacity rechargeable batteries, such that the sizes of the batteries increase.

As such, the prismatic rechargeable batteries become thicker, and their heat dissipation efficiencies are different depending on whether the batteries are at the inside portion or at the outside portion of the battery system. Therefore, it is difficult to secure the safety of these batteries of the power system when they are being overcharged.

The above information disclosed in this Background section is only for enhancement of understanding of the background of the present invention, and therefore it may contain information that does not form the prior art that is already known in this country to a person of ordinary skill in the art.

SUMMARY OF THE INVENTION

An exemplary embodiment of the present invention is directed toward a rechargeable battery which improve the safety of the rechargeable battery when it is being overcharged by short-circuiting its outside electrode terminals and maintaining the short circuit state.

According to an embodiment of the present invention, a rechargeable battery includes a case, a first electrode coupled to the case, a second electrode coupled to the case and the second electrode having a portion extending outside of the case, a short bar electrically coupled to said portion of the second electrode, and an extensible member extending from the case and at least a portion of the short bar being on the extensible member with a gap therebetween. The extensible member is configured to couple the short bar electrically to the first electrode in response to an overcharging condition of the rechargeable battery, thereby short-circuiting the first and second electrodes via the short bar.

In one embodiment, the extensible member may include a extensible.

In one embodiment, the extensible member may be configured to extend toward the short bar when an internal pressure of the case is above a set value.

In one embodiment, the extensible member may include an electrical conductor.

In one embodiment, the extensible member and the short bar may be configured to remain electrically coupled to each other in response to the overcharging condition.

In one embodiment, at least one of the extensible member or the short bar may be configured to melt when the extensible member and the short bar conduct an electrical current in response to the overcharging condition.

In one embodiment, the short bar may be welded and/or screwed to said portion of the second electrode.

In one embodiment, the rechargeable battery may further include a spring having two end portions with one of the end portions coupled to the case and the other one of the end portions coupled to a side of the extensible member facing the short bar. The spring may be configured to apply a pressure on the extensible member in a direction toward the case and away from the short bar.

In one embodiment, the spring may include two springs positioned diametrically on the side of the extensible member facing the short bar.

In one embodiment, the pressure applied on the extensible member by the spring may be less than an internal pressure of the case applied on the extensible member when the rechargeable battery is in the overcharging condition.

According to another embodiment of the present invention, a rechargeable battery includes a case, a first electrode coupled to the case, a second electrode coupled to the case and the second electrode having a portion extending outside of the case, a third electrode coupled to the case and the third electrode having a portion extending outside of the case, a first short bar electrically coupled to said portion of the second electrode, a second short bar electrically coupled to said portion of the third electrode, the first short bar being adjacent to the second short bar with a gap therebetween, and an extensible member extending from the case, the extensible member located below the first and second short bars with a gap therebetween. The extensible member is configured to couple the first short bar electrically to the second short bar in response to an overcharging condition of the rechargeable battery, thereby short-circuiting the first and second electrodes via the first and second short bars.

In one embodiment, the extensible member may include a extensible.

In one embodiment, the extensible member may be configured to extend toward the first and second short bars when an internal pressure of the case is above a set value.

In one embodiment, the second short bar may be between the first short bar and the extensible member.

In one embodiment, the first and second short bars may be at substantially a same distance from the extensible member.

In one embodiment, the extensible member may include an electrical conductor.

In one embodiment, the rechargeable battery may further include a conduction plate on the extensible member, wherein the conduction plate is configured to electrically couple the first and second short bars together in response to the overcharging condition.

In one embodiment, the first and second short bars may be configured to remain electrically coupled to each other in response to the overcharging condition.

In one embodiment, at least one of the first short bar or the second short bar may be configured to melt when the first short bar and the second short bar conduct an electrical current in response to the overcharging condition.

In one embodiment, the first short bar may be welded and/or screwed to said portion of the second electrode.

DESCRIPTION OF REFERENCE NUMERALS INDICATING ELEMENTS IN THE DRAWINGS

Figure 1:
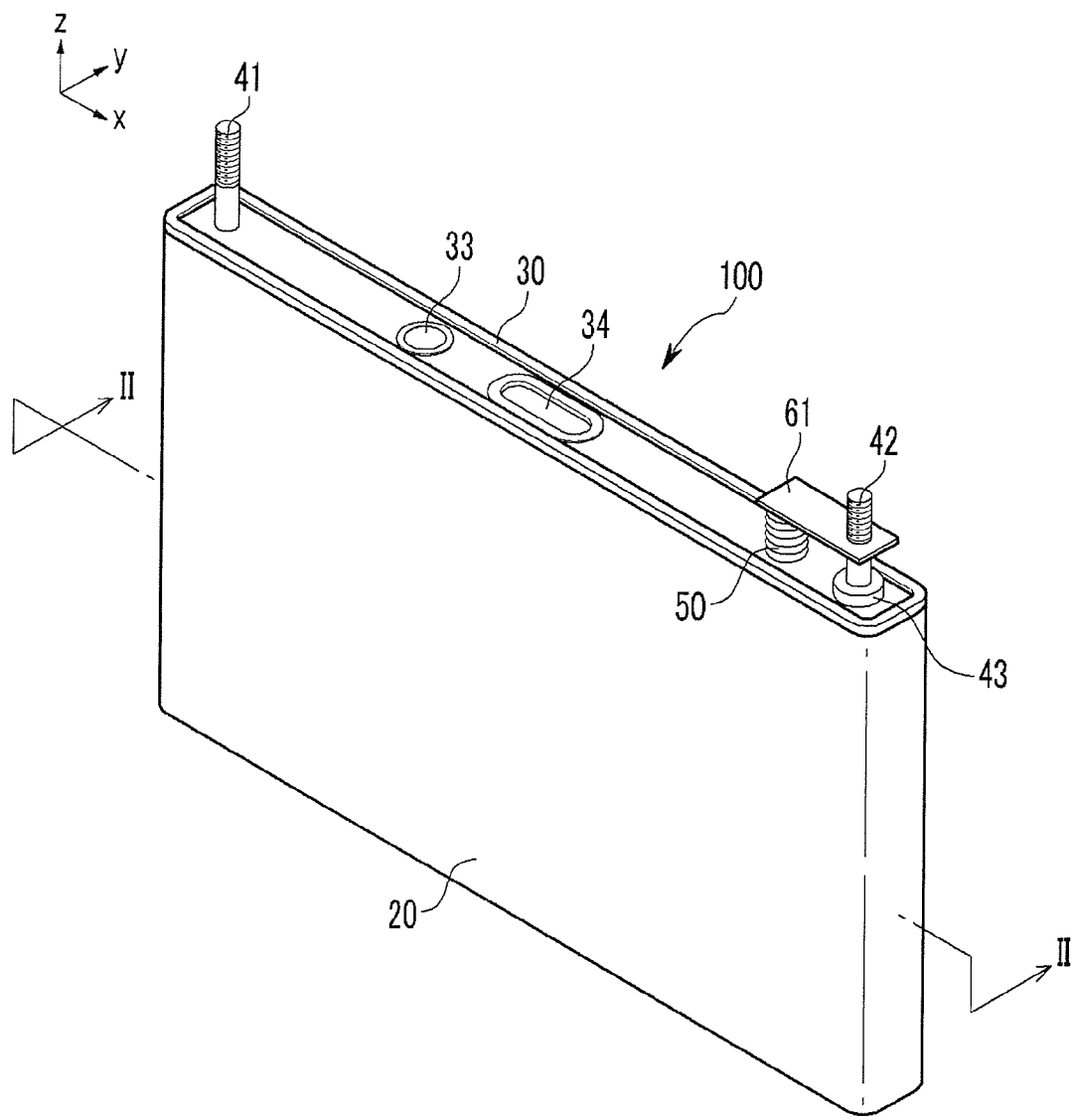
FIG. 1 is a schematic perspective view of a rechargeable battery according to an embodiment of the present invention.

| | |
|---|---|
| 100, 200, 300, 400: rechargeable battery | |
| 10: electrode assembly | |
| 11: positive electrode | 12: negative electrode |
| 111, 121: uncoated region | 13: separator |
| 20: case | 30: cap plate |
| 31, 36: terminal hole | 32: electrolyte injection hole |
| 33: sealing plug | 34: vent portion |
| 35: through hole | |
| 41, 42: first electrode, second electrode | |
| 43: interposing insulator | |
| 51, 52: lead member | 50, 53, 54: extensible member |
| 55: conduction plate | 61: short bar |
| 71: plate spring | 72: support member |
| 81, 91: first short bar | 82, 92: second short bar |
| 83, 93: assistance electrode | C: gap |
| C1, C2, C3: first gap, second gap, third gap | |

DETAILED DESCRIPTION OF EXEMPLARY EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
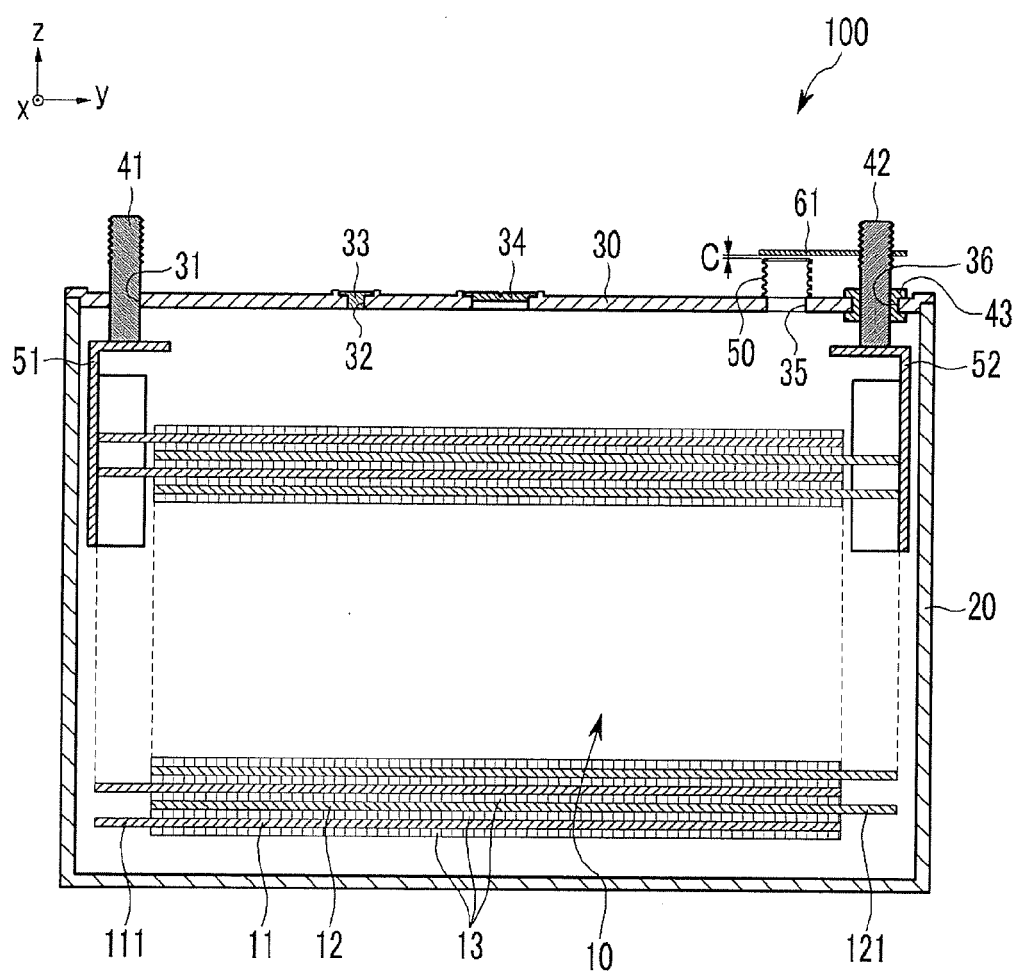
FIG. 2 is a schematic cross-sectional view of the rechargeable battery taken along the line II-II of FIG. 1.

FIG. 1 is a schematic perspective view of a rechargeable battery 100 according to an embodiment of the present invention, and FIG. 2 is a schematic cross-sectional view of the rechargeable battery 100 taken along the line II-II of FIG. 1.

Referring to FIGS. 1 and 2, the rechargeable battery 100 includes a case 20 in which an electrode assembly 10 is enclosed, a cap plate 30 which closes up an opening formed at a side of the case 20, a first electrode terminal 41 and a second electrode terminal 42 fitted in terminal holes 31 and 36, respectively, of the cap plate 30, and lead members 51 and 52 connecting the first and second electrode terminals 41 and 42, respectively, to the electrode assembly 10.

The electrode assembly 10 includes a separator 13 as an insulator, and a positive electrode 11 and a negative electrode 12 respectively located at opposite sides of the separator 13. The positive electrode 11, the negative electrode 12 and the separator 13 are rolled up together to form a jelly roll shape.

The positive electrode 11 and the negative electrode 12 are formed with current collectors of thin plated metallic foils. Each of the positive and negative electrodes 11 and 12 is partitioned to have a coated region and uncoated regions 111 and 121 which are partitioned by whether to coat active material. That is, the coated region is an area coated with the active material, and the uncoated regions 111 and 121 are areas that are not coated with the active material.

Each pair of the uncoated regions 111 and 121 are at opposite ends to each other and located at the longitudinal (or horizontal) opposite ends of the positive electrode 11 and the negative electrode 12. The uncoated regions 111 and 121 are connected to the lead members 51 and 52, respectively, and the lead members 51 and 52 are then connected to the first and second electrode terminals 41 and 42, respectively.

The case 20 forms an external appearance or shape of the rechargeable battery 100, and is formed by, for example, an electrically conductive metal such as aluminum, aluminum alloy or nickel-plated steel. The case 20 provides a space in which the electrode assembly 10 is enclosed, and may be formed as a prismatic case, for instance, in a shape of hexahedron. The prismatic case 20 has a wider heat dissipating area and is superior to a cylindrical case in heat dissipation efficiency.

The cap plate 30 is formed by a thin plate, and is fitted into the opening formed at a side of the case 20, thereby closing up the opening. The cap plate 30 has an electrolyte injection hole 32 for injecting the electrolyte into the inside of the case 20 closed by the cap plate 30. The electrolyte injection hole 32 is sealed up with a sealing plug 33 after injecting the electrolyte.

Further, in order to prevent or reduce the likelihood of explosion of the rechargeable battery 100 due to an increase of its internal pressure, the cap plate 30 has a vent portion 34 that would be torn out or ruptured when the internal pressure reaches a set or predetermined value, thereby allowing internal gas to be discharged.

In addition, in order to improve safety when the rechargeable battery 100 is overcharged, the rechargeable battery 100 is configured to short-circuit the first and the second electrode terminals 41 and 42 at the outside of the case 20. Further, the rechargeable battery 100 is configured to firmly maintain the short circuit state of the first and the second electrode terminals 41 and 42, thereby preventing the short circuit state from returning to a release state (or open circuit state).

For instance, the positive electrode 11 of the electrode assembly 10 is connected to the first electrode terminal 41 via the lead member 51, and the negative electrode 12 is connected to the second electrode terminal 42 via the lead member 52.

The first electrode terminal 41 is inserted into the terminal hole 31 of the cap plate 30, thereby being electrically or conductively connected to the cap plate 30. The first electrode terminal 41 may be welded to the cap plate 30 while being inserted into the terminal hole 31. Thus, the cap plate 30 and the first electrode terminal 41 are charged with a positive voltage. In addition, the case 20 may be electrically or conductively connected to the cap plate 30.

The second electrode terminal 42 is inserted into the terminal hole 36 with an interposing insulator 43, such that the second electrode terminal 42 is kept electrically insulated from the cap plate 30. Hence, the second electrode terminal 42 is charged with a negative voltage, and is kept electrically insulated from the first electrode terminal 41 and the cap plate 30.

The rechargeable battery 100 includes a suitable extensible member 50, e.g., a bellows member or bellows, which is configured to short-circuit a portion that is electrically or conductively connected to the first electrode terminal 41 and a portion that is electrically or conductively connected to the second electrode terminal 42 when the internal pressure reaches a set value.

The rechargeable battery 100 further includes a short bar 61 which forms a short circuit configuration with the extensible member 50 when the rechargeable battery 100 is overcharged. That is, the extensible member 50 is connected to the first electrode terminal 41 via the cap plate 30, and the short bar 61 is directly and electrically connected to the second electrode terminal 42.

The cap plate 30 has a through hole 35 at a portion adjacent to the second electrode terminal 42. The extensible member 50 is fixated on the cap plate 30 to cover the through hole 35. Accordingly, the internal pressure of the rechargeable battery 100 may work at the extensible member 50 through the through hole 35.

While the rechargeable battery 100 is operated normally, and thus the internal pressure remains within a normal range, the extensible member 50 remains at a contracted state (see FIG. 2). The extensible member 50 may be extended to contact the short bar 61 resulting in short-circuiting when the internal pressure goes over a set or predetermined value.

The extensible member 50 may be made from an electrically conductive material such as aluminum or metallic material. Further, the extensible member 50 may be welded to the cap plate 30 to thereby form an electrically conductive structure with the cap plate 30. Considering weldability, the extensible member 50 may be made from the same material as the cap plate 30.

Since the extensible member 50 is electrically or conductively connected to the cap plate 30, the extensible member 50 is substantially and electrically connected to the positive electrode 11 of the electrode assembly 10 via the lead member 51 of the first electrode terminal 41 and the uncoated region 111.

In the embodiment illustrated in FIG. 2, the cap plate 30 and the first electrode terminal 41 are connected to the positive electrode 11, and the second electrode terminal 42 is electrically insulated from the cap plate 30 and connected to the negative electrode 12. However, a configuration in which the above described connections of the first and second electrode terminals are reversed is also possible and is within the scope of the present invention.

As illustrated in the embodiment shown in FIG. 2, the rechargeable battery 100 in which the cap plate 30 and the case 20 are electrically connected to the positive electrode 11 may have a better heat dissipation efficiency when compared to a rechargeable battery in which the cap plate 30 and the case 20 are electrically connected to the negative electrode 12. Referring to the graph of FIG. 7, temperature (a) changes after short-circuiting the rechargeable battery 100 at the side of the negative electrode 12 are less significant than that of the temperature (c) changes after short-circuiting the rechargeable battery 100 at the side of the positive electrode 11.

One end of the short bar 61 is fixed at the second electrode terminal 42, and the other end of the short bar 61 is extended in a direction across the end of the extensible member 50. An end portion of the short bar 61 is on or faces the extensible member 50. Accordingly, the short bar 61 may contact the extensible member 50 or be separated from the extensible member 50 depending upon the expansion or contraction of the extensible member 50.

For example, the short bar 61 is coupled with screws to the second electrode terminal 42 and electrically connected to the second electrode terminal 42. Further, the short bar 61 may be welded to the second electrode terminal 42, or both screw coupling and welding may be performed.

Accordingly, the positive electrode 11 of the electrode assembly 10 is electrically connected to the extensible member 50 via the lead member 51, the first electrode terminal 41 and the cap plate 30, and the negative electrode 12 is electrically connected to the short bar 61 via the lead member 52 and the second electrode terminal 42.

While the internal pressure of the rechargeable battery 100 remains within the normal range, the extensible member 50 is separated from the short bar 61 with a gap C therebetween.

Figure 3:
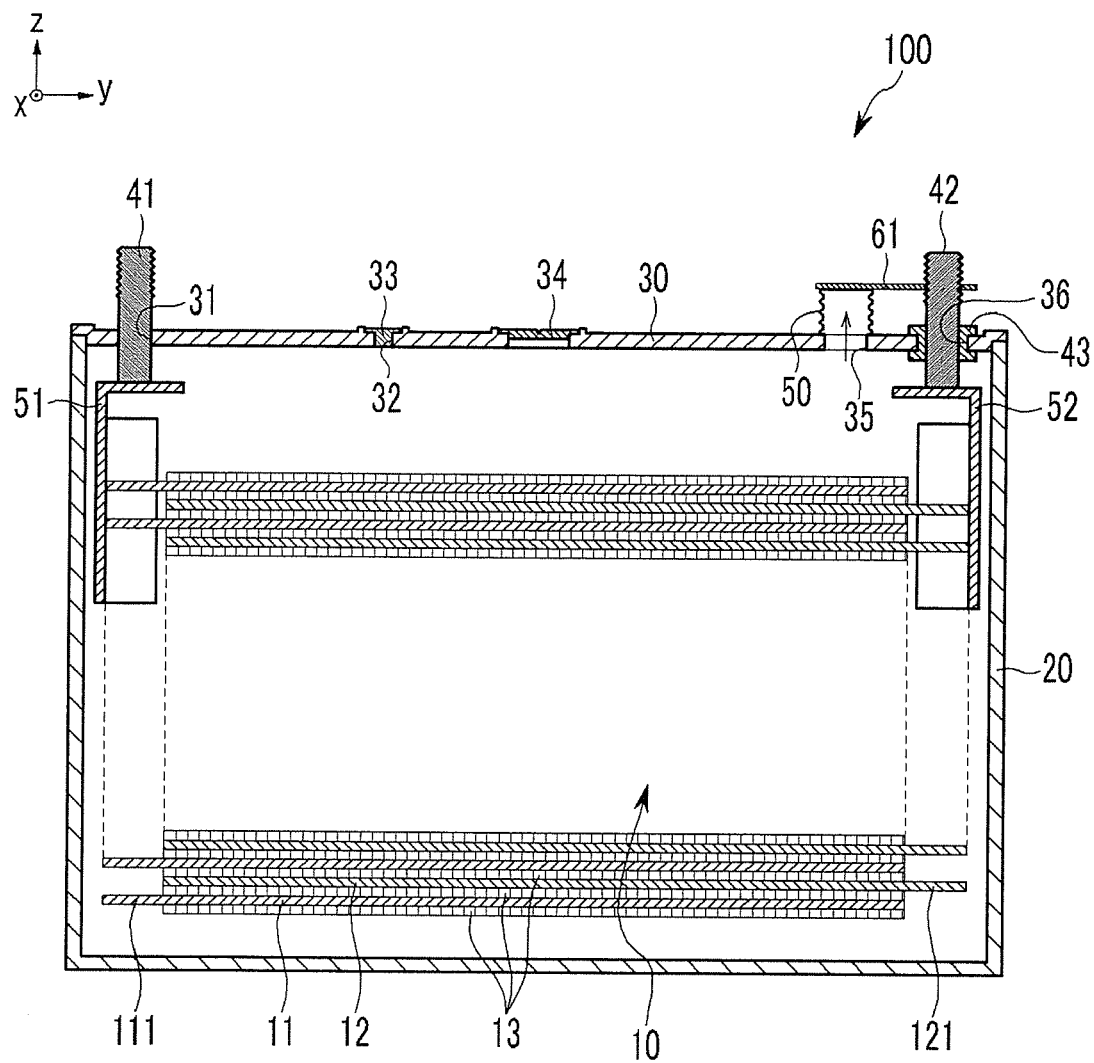
FIG. 3 is a schematic cross-sectional view showing a short circuit state of the electrode terminals when the internal pressure of the rechargeable battery increases.

FIG. 3 is a schematic cross-sectional view showing a short circuit state of the electrode terminals when the internal pressure of the rechargeable battery increases. Referring to FIG. 3, the internal pressure of the rechargeable battery 100 exceeds the normal range, such that the extensible member 50 is extended to thereby be short-circuited with the short bar 61. Accordingly, the rechargeable battery 100 may be released from an overcharging state.

The extensible member 50 and the short bar 61 are short-circuited and melted to be stuck to each other, such that the rechargeable battery 100 maintains the short circuit state. That is, the rechargeable battery 100 does not return to the overcharged state. For example, the temperatures of the extensible member 50 and the short bar 61 are suitably increased due to their resistances to a short circuit current to melt and couple the extensible member 50 to the short bar 61.

Figure 7:
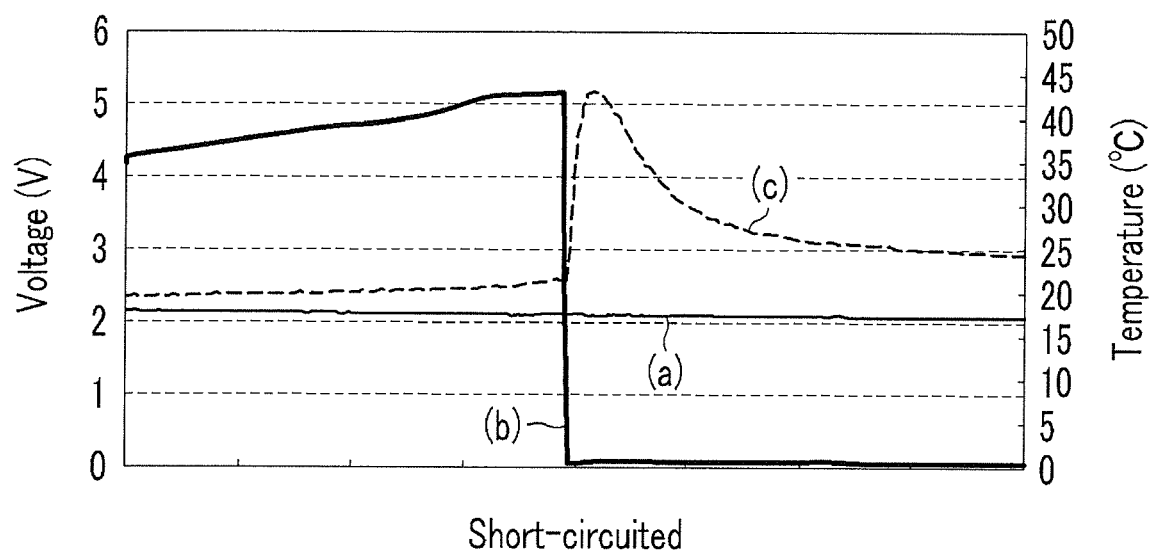
FIG. 7 is a graph showing decrease of voltage and temperature due to a short circuit at the outside terminals of a rechargeable battery according to an embodiment of the present invention.

FIG. 7 is a graph showing decreases of voltage and temperature due to a short circuit at the outside terminals of a rechargeable battery. Referring to FIG. 7, a result of a short circuit experiment is exhibited. In the experiment, a lead storage battery was overcharged at 36 A, and a positive electrode and a negative electrode were short-circuited with each other using an electrically conductive member of 0.05 mΩ before the vent was operated.

Referring to the graph of FIG. 7, the voltage (b) of the lead storage battery rapidly dropped to 0 V, and the temperature (c) at the side of the positive electrode increased rapidly and then decreased rapidly, when the short circuit occurred. The temperature (a) at the side of the negative electrode remains substantially steady.

In view of the foregoing, it was confirmed from the above described experiment that the exterior short-circuit configuration like the embodiment shown in FIG. 1 could improve the safety of the rechargeable battery 100 when overcharged.

Hereinafter, various other embodiments of the present invention will be described. Descriptions about the same or similar elements as the embodiment shown in FIG. 1 would not be described again in detail, and elements different from each other will be described in more detail.

Figure 4:
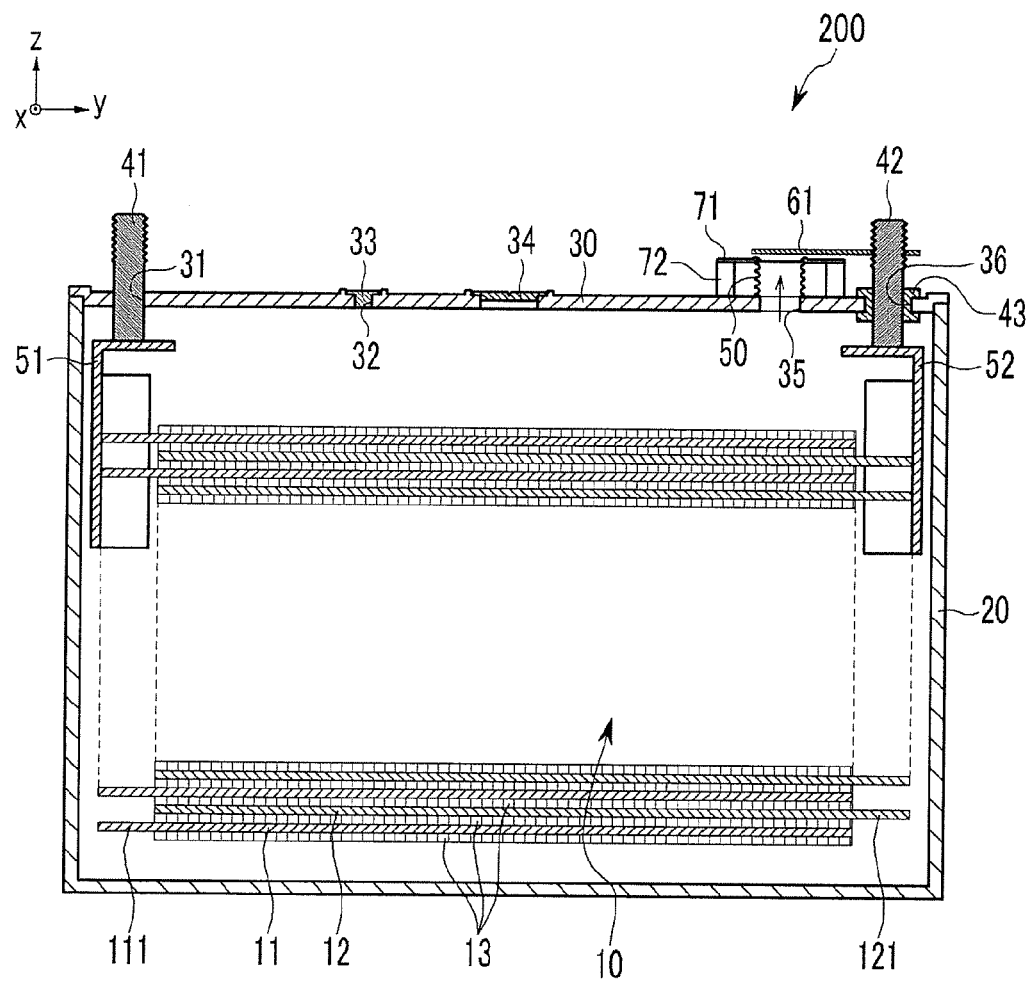
FIG. 4 is a schematic cross-sectional view showing a rechargeable battery according to another embodiment of the present invention.

FIG. 4 is a schematic cross-sectional view showing a rechargeable battery 200 according to another embodiment of the present invention. Referring to FIG. 4, the rechargeable battery 200 in accordance with the embodiment shown in FIG. 4 further includes a plate spring 71 which is fixated on the cap plate 30 and supports the extensible member 50 at its free end.

In more detail, the plate spring 71 is provided to the upper side of the extensible member 50 that is cylindrically shaped, and may support the extensible member 50 in a downward direction toward the cap plate 30. In the embodiment shown in FIG. 4, a pair of plate springs 71 is provided at diametrically opposing sides of the upper side of the extensible member 50, such that the upper side of the extensible member 50 is balanced by the pair of plate springs 71.

Accordingly, the plate spring 71 may be fixated to the cap plate 30 with an interposing support member 72. That is, the support member 72 is fixed on the cap plate 30, and then one end of the plate spring 71 is fixed on the support member 72. Further, the plate spring 71 supports the upper side of the extensible member 50 by the other end. Here, the combined height of the support member 72 and the plate spring 71 is substantially the same as the height of the extensible member 50 when contracted.

The rechargeable battery 200 of the embodiment shown in FIG. 4 may prevent the extensible member 50 from being extended to be short-circuited with the short bar 61 due to a shock or a vibration, when the internal pressure of the rechargeable battery 200 remains within a normal range.

The plate spring 71 applies a suitable amount of its elastic or spring force to maintain the extensible member 50 in the contracted state while the internal pressure of the rechargeable battery 200 is within the normal range, and to allow the extensible member 50 to extend and push away the plate spring 71 when the internal pressure exceeds the normal range. Hence, the plate spring 71 does not disturb the extension of the extensible member 50 when the internal pressure of the rechargeable battery 200 increases, and still also prevent or protect the extensible member 50 from mis-contacting with the short bar 61 when the internal pressure is within the normal range.

Figure 5:
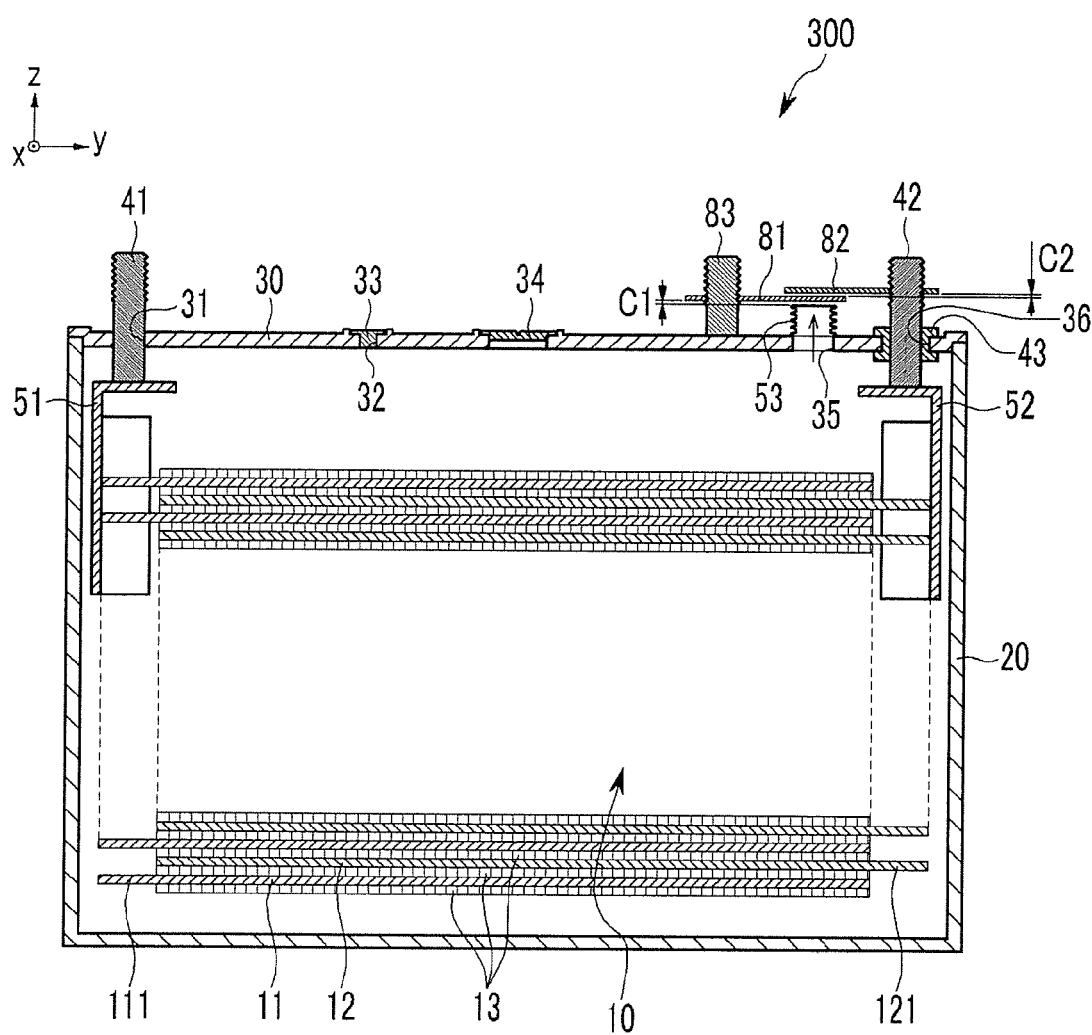
FIG. 5 is a schematic cross-sectional view showing a rechargeable battery according to another embodiment of the present invention.

FIG. 5 is a schematic cross-sectional view showing a rechargeable battery 300 according to another embodiment of the present invention. Referring to FIG. 5, the rechargeable battery 300 in accordance with the embodiment shown in FIG. 5 includes a extensible member 53, a first short bar 81 and a second short bar 82 such that a portion which is electrically or conductively connected to the first electrode terminal 41 and a portion which is electrically or conductively connected to the second electrode terminal 42 are short-circuited with each other when the internal pressure increases.

In the rechargeable battery 100 of the embodiment shown in FIGS. 1-3, the extensible member 50 is made from an electrically conductive material to thereby be short-circuited directly with the short bar 61. Instead, in the rechargeable battery 300 of the embodiment shown in FIG. 5, the first short bar 81 is electrically or conductively connected to the first electrode terminal 41 and the cap plate 30, and the second short bar 82 is electrically or conductively connected to the second electrode terminal 42, such that the first short bar 81 and the second short bar 82 are configured to be short-circuited directly with each other by utilizing the extensible member 53.

For this operation, the first short bar 81 is fixated on an assistance electrode 83, and a portion of the first short bar 81 is on or faces the extensible member 53 with a first gap C1 therebetween on an extension line of the extensible member 53 in a direction of extension. For example, the assistance electrode 83 is electrically or conductively connected to the cap plate 30, and the first short bar 81 is screw-coupled to the assistance electrode 83. The first short bar 81 may be welded to the assistance electrode 83 or may be screw-coupled and welded at the same time.

The second short bar 82 is fixated on the second electrode terminal 42, and a portion of the second short bar 82 is on or faces a portion of the first short bar 81 with a second gap C2 therebetween on the extension line of the extensible member 53 in the direction of extension. That is, the extensible member 53, the first short bar 81 and the second short bar 82 are arranged on the extension line of the extensible member 53 with the first gap C1 and the second gap C2 therebetween.

Accordingly, while the internal pressure of the rechargeable battery 300 remains within the normal range, the extensible member 53, the first short bar 81 and the second short bar 82 are kept insulated from one another by maintaining the first gap C1 and the second gap C2. However, when the internal pressure exceeds the normal range, the extensible member 53 is extended to closely contact with the first short bar 81, and is extended further to thereby raise the first short bar 81 to short-circuit the first short bar 81 with the second short bar 82.

In the rechargeable batteries 100 and 200 of the embodiments shown in FIGS. 1-4, the extensible member 50 is made from a suitable electrically conductive material since the extensible member 50 is electrically conducted to thereby form a short circuit configuration. However, in the rechargeable battery 300 of the embodiment shown in FIG. 5, the extensible member 53 may be made from an electrically insulation material because the extensible member 53 does not need to be electrically conducted with the first short bar 81 or the second short bar 82.

Figure 6:
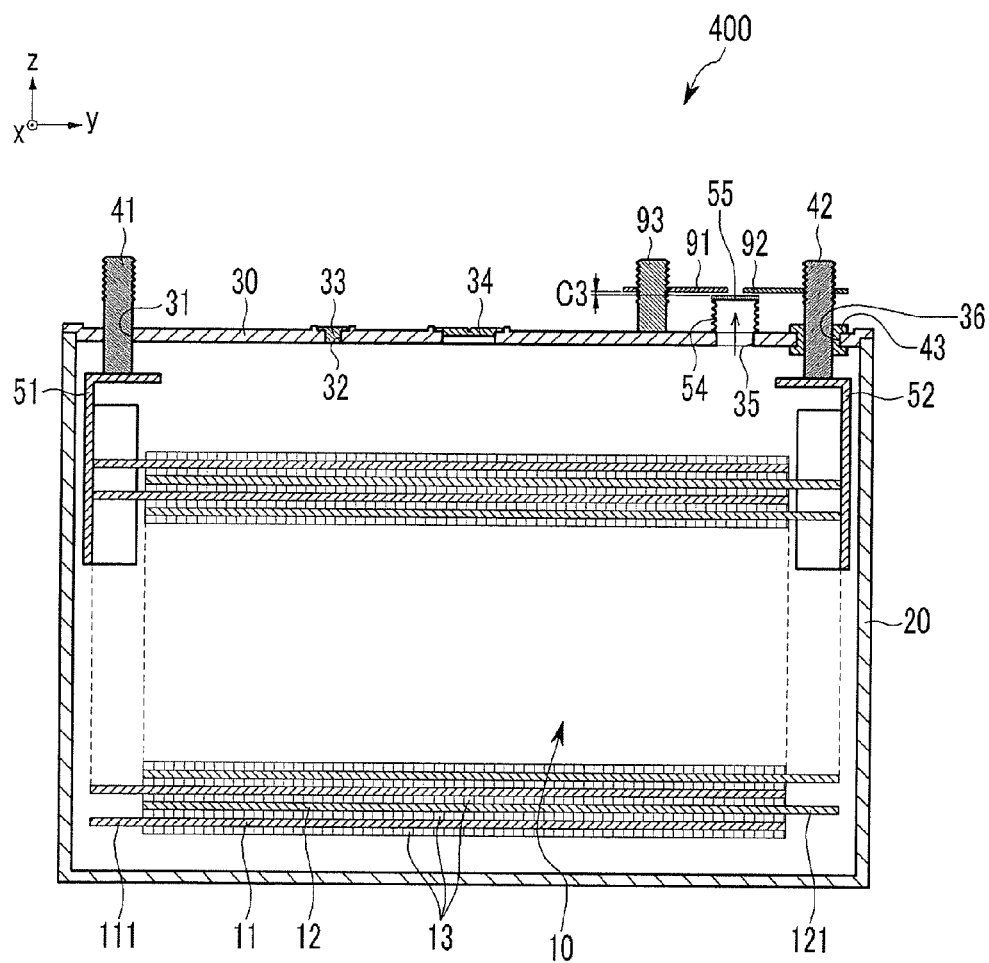
FIG. 6 is a schematic cross-sectional view showing a rechargeable battery according to another embodiment of the present invention.

FIG. 6 is a schematic cross-sectional view of a rechargeable battery 400 according to another embodiment of the present invention. Referring to FIG. 6, the rechargeable battery 400 of this embodiment includes a extensible member 54, a conduction plate 55, a first short bar 91 and a second short bar 92 such that a portion which is electrically or conductively connected to the first electrode terminal 41 and a portion which is electrically or conductively connected to the second electrode terminal 42 are short-circuited with each other when an internal pressure of the rechargeable battery 400 reaches a set value.

The rechargeable battery 300 of the embodiment shown in FIG. 5 has a configuration including the first short bar 81 and the second short bar 82 which are short-circuited as the extensible member 53 is extended. Instead, the rechargeable battery 400 of the embodiment shown in FIG. 6 has a configuration that the first short bar 91 and the short bar 92 are short-circuited through an electrical conduction structure such as the conduction plate 55 which is located on an upper side of the extensible member 54 as the extensible member 54 is extended.

For this operation, the first short bar 91 and the second short bar 92 are located at substantially the same height from the conduction plate 55 of the extensible member 54. The first short bar 91 is fixated on an assistance electrode 93, and a portion of the first short bar 91 is on or faces the upper side of the extensible member 54 with a third gap C3 therebetween on an extension line of the extensible member 54 in a direction of extension.

The second short bar 92 is fixated on the second electrode terminal 42, and a portion of the second short bar 92 is on or faces the upper side of the extensible member 54 with the third gap C3 therebetween on the extension line of the extensible member 54 in the direction of extension. That is, the gap between the first short bar 91 and the extensible member 54 and the gap between the second short bar 92 and the extensible member 54 are substantially the same as the third gap C3. The first short bar 91 and the second short bar 92 are on or face different portions of the upper side of the extensible member 54.

Accordingly, while the internal pressure of the rechargeable battery 400 remains within a normal range, the extensible member 54 is kept electrically insulated from the first short bar 91 and the second short bar 92 while being spaced apart by the third gap C3. However, when the internal pressure of the rechargeable battery 400 exceeds the normal range, the extensible member 54 is extended to thereby short-circuit the conduction plate 55 provided on the upper side of the extensible member 54 with the first short bar 91 and the second short bar 92.

In the rechargeable battery 300 of the embodiment shown in FIG. 5, the extensible member 53 raises the first short bar 81 to short-circuit with the second short bar 82, such that the first short bar 81 and the second short bar 82 are directly short-circuited. Instead, in the rechargeable battery 400 of the embodiment shown in FIG. 6, the extensible member 54 raises the conduction plate 55 to thereby short-circuit the first short bar 91 with the second short bar 92 via the conduction plate 55.

In the rechargeable batteries 300 and 400 of the embodiments shown in FIGS. 5 and 6, the extensible member 53 and 54 may be formed with various suitable materials other than an electrically conductive material.

While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A rechargeable battery comprising:
   a case;
   a first electrode coupled to the case;
   a second electrode coupled to the case, the second electrode having a portion extending outside of the case;
   a first short bar electrically coupled to the first electrode;
   a second short bar electrically coupled to said portion of the second electrode; and
   an extensible member extending from the case, the extensible member being extensible from a first position in which a conductive portion on the extensible member is spaced apart from the first short bar and the second short bar by a gap to an extended position in which the conductive portion contacts the first short bar and the second short bar,
   wherein the extensible member is configured to couple the second short bar electrically to the first short bar in the extended position in response to an overcharging condition of the rechargeable battery, thereby short-circuiting the first and second electrodes via the first and second short bars, wherein the extensible member comprises an electrical conductor, and wherein the extensible member is electrically coupled to a cap plate on the case.

2. The rechargeable battery as claimed in claim 1, wherein the extensible member is configured to extend toward the first and second short bars when an internal pressure of the case is above a set value.

3. The rechargeable battery as claimed in claim 1, wherein the extensible member and the first and second short bars are configured to remain electrically coupled to each other in response to the overcharging condition.

4. The rechargeable battery as claimed in claim 1, wherein at least one of the extensible member or the first and second short bars is configured to melt when the extensible member and the first and second short bars conduct an electrical current in response to the overcharging condition.

5. The rechargeable battery as claimed in claim 1, wherein the second short bar is welded and/or screwed to said portion of the second electrode.

6. The rechargeable battery as claimed in claim 1, further comprising:
   a spring having two end portions with one of the end portions coupled to the case and the other one of the end portions coupled to a side of the extensible member acing the short bar,
   wherein the spring is configured to apply a pressure on the extensible member in a direction toward the case and away from the short bar.

7. The rechargeable battery as claimed in claim 6, wherein the spring comprises two springs positioned diametrically on the side of the extensible member facing the short bar.

8. The rechargeable battery as claimed in claim 6, wherein the pressure applied on the extensible member by the spring is less than an internal pressure of the case applied on the extensible member when the rechargeable battery is in the overcharging condition.

9. A rechargeable battery comprising:
   a case;
   a first electrode coupled to the case;
   a second electrode coupled to the case, the second electrode having a portion extending outside of the case;
   a third electrode coupled to the case, the third electrode having a portion extending outside of the case;
   a first short bar electrically coupled to said portion of the second electrode;
   a second short bar electrically coupled to said portion of the third electrode, the first short bar being adjacent to the second short bar with a gap therebetween; and
   an extensible member extending from the case, the extensible member located below the first and second short bars with a gap therebetween,
   wherein the extensible member is configured to couple the first short bar electrically to the second short bar in response to an overcharging condition of the rechargeable battery, thereby short-circuiting the first and second electrodes via the first and second short bars.

10. The rechargeable battery as claimed in claim 9, wherein the extensible member is electrically coupled to a cap plate on the case.

11. The rechargeable battery as claimed in claim 9, wherein the extensible member is configured to extend toward the first and second short bars when an internal pressure of the case is above a set value.

12. The rechargeable battery as claimed in claim 9, wherein the second short bar is between the first short bar and the extensible member.

13. The rechargeable battery as claimed in claim 9, wherein the first and second short bars are at substantially a same distance from the extensible member.

14. The rechargeable battery as claimed in claim 13, wherein the extensible member comprises an electrical conductor.

15. The rechargeable battery as claimed in claim 13, further comprising a conduction plate on the extensible member,
   wherein the conduction plate is configured to electrically couple the first and second short bars together in response to the overcharging condition.

16. The rechargeable battery as claimed in claim 9, wherein the first and second short bars are configured to remain electrically coupled to each other in response to the overcharging condition.

17. The rechargeable battery as claimed in claim 9, wherein at least one of the first short bar or the second short bar is configured to melt when the first short bar and the second short bar conduct an electrical current in response to the overcharging condition.

18. The rechargeable battery as claimed in claim 9, wherein the first short bar is welded and/or screwed to said portion of the second electrode.

* * * * *

UNITED STATES PATENT AND TRADEMARK OFFICE
CERTIFICATE OF CORRECTION

| | | |
|---|---|---|
| PATENT NO. | : 8,323,813 B2 | Page 1 of 1 |
| APPLICATION NO. | : 12/701401 | |
| DATED | : December 4, 2012 | |
| INVENTOR(S) | : Sang-Won Byun et al. | |

It is certified that error appears in the above-identified patent and that said Letters Patent is hereby corrected as shown below:

In the Claims

Column 10, Claim 6, line 2            Delete "acing"
                                      Insert -- facing --

Signed and Sealed this
Fourteenth Day of April, 2015

Michelle K. Lee
*Director of the United States Patent and Trademark Office*